United States Patent
Rahman et al.

(10) Patent No.: US 8,452,347 B2
(45) Date of Patent: *May 28, 2013

(54) HEADSET AND AUDIO GATEWAY SYSTEM FOR EXECUTION OF VOICE INPUT DRIVEN APPLICATIONS

(75) Inventors: Hosain Rahman, San Francisco, CA (US); Alexander Asseily, London (GB); Darin Rajan, San Francisco, CA (US)

(73) Assignee: AliphCom, San Francisco, CA (US)

( * ) Notice: Subject to any disclaimer, the term of this patent is extended or adjusted under 35 U.S.C. 154(b) by 1084 days.

This patent is subject to a terminal disclaimer.

(21) Appl. No.: 12/354,689

(22) Filed: Jan. 15, 2009

(65) Prior Publication Data

US 2010/0151788 A1    Jun. 17, 2010

Related U.S. Application Data

(60) Provisional application No. 61/022,168, filed on Jan. 18, 2008.

(51) Int. Cl.
  *H04M 1/00* (2006.01)
  *H04B 7/00* (2006.01)
(52) U.S. Cl.
  USPC .......................... 455/569.1; 455/41.2; 455/418
(58) Field of Classification Search
  USPC ............................... 455/41.2, 418, 419, 569.1
  See application file for complete search history.

(56) References Cited

U.S. PATENT DOCUMENTS

| | | | |
|---|---|---|---|
| 8,055,307 B2 * | 11/2011 | Rahman et al. | 455/569.1 |
| 2003/0040341 A1 | 2/2003 | Casais | |
| 2004/0203351 A1 * | 10/2004 | Shearer et al. | 455/41.1 |
| 2006/0020716 A1 | 1/2006 | Suryanarayana | |
| 2006/0099992 A1 | 5/2006 | Ju | |
| 2007/0004463 A1 * | 1/2007 | Clark et al. | 455/569.1 |
| 2007/0142040 A1 | 6/2007 | Weinans et al. | |
| 2007/0283033 A1 | 12/2007 | Bloebaum et al. | |
| 2009/0082062 A1 * | 3/2009 | Boyaci et al. | 455/557 |
| 2009/0117890 A1 * | 5/2009 | Jacobsen et al. | 455/419 |
| 2009/0251409 A1 * | 10/2009 | Parkinson et al. | 345/156 |

* cited by examiner

*Primary Examiner* — Blane J Jackson
(74) *Attorney, Agent, or Firm* — Kokka & Backus, PC

(57) ABSTRACT

A system including a headset and an audio gateway, and software applications that may be used with such headsets and gateways. The headset enables a user to discover and interact with applications resident on the headset, gateway, or a network accessible by the gateway. The headset functions as an application platform for the control and execution of the applications. The invention includes a method for providing a service to a user of the headset. The method involves the headset performing service discovery on the audio gateway to determine a method of transferring an application to the audio gateway, where the application provides the service. The headset causes the application to be transferred to the audio gateway using a method based on the service discovery, and the audio gateway executes the application, enabling the user to issue voice commands that are executed by the audio gateway to provide the service.

42 Claims, 9 Drawing Sheets

HEADSET AND AUDIO GATEWAY SYSTEM FOR EXECUTION OF VOICE INPUT DRIVEN APPLICATIONS

CROSS-REFERENCE TO RELATED APPLICATION

This application claims priority from and the benefit of the previously filed provisional patent application entitled "Wireless Handsfree Headset Method and System with Handsfree Applications," filed Jan. 18, 2008, having application No. 61/022,168, and the contents of which is hereby incorporated by reference in its entirety.

BACKGROUND

Embodiments of the present invention are directed to mobile communications devices and to related services and applications, and more specifically, to headsets used with mobile phones, personal digital assistants (PDA), and computing devices, where the headset is configured to operate with software applications and communication technologies residing on the communications devices. The present invention enables wired or wireless headsets to be used to discover applications and services, assist in the provisioning of those applications and services, and cooperate in the execution of applications resident on the communications devices to provide value added services to users of the headset.

Headsets, and particularly wireless headsets, are used with mobile communications devices to enhance the experience of the device user by allowing hands-free operation. This provides greater flexibility and freedom of movement for the user, while enabling the communication device to be placed in a more convenient location. For purposes of describing the present invention, mobile communication devices can include, but are not limited to, mobile phones such as cellular or satellite phones, personal data assistants (PDA's) with cellular phone capabilities, portable computing devices with communications capabilities, or other devices capable of using wireless communication methods and networks. Wired or wireless headsets may also be used with fixed location devices such as desktop computers (PCs), where telephony (such as VoIP) or other services may be provided via a connection to a communications network. In some cases such mobile and fixed location communications devices may be referred to as an "audio gateway" or "voice gateway."

Wireless headsets allow communication device users to communicate in a hands-free mode once a call is initiated or received, where initiating or accepting a call typically requires a physical user interaction with a control element of a user interface. Typically, wireless headsets are controlled by, or are configured to operate with, an audio or voice gateway, which as noted, may be a mobile or fixed location communications device such as a mobile phone or personal computer (PC). The audio or voice gateway is the functional unit in communication with the wired or wireless communication network being used for voice and data communications. For the case of a wireless headset, the audio or voice gateway and headset communicate and transfer data using a wireless technology, such as Bluetooth, IR (infrared), or another suitable method. Applications available over the wireless network (which may include applications resident on a wired network that is coupled to the wireless network) may in some cases be accessed using the gateway, typically by establishing a connection to the network using an interface of the gateway.

Although wireless headsets make voice communications more convenient, present embodiments of such devices have limitations that make them less desirable for certain uses and applications. One disadvantage is that it typically requires a multi-step process on the part of a user to access an application and interact with it using the wireless headset. This creates a disincentive for the user to access and use such applications, and limits the utility of the headset as a means of providing access to value added services. Another disadvantage is that most headsets lack sufficient noise suppression or noise cancellation capabilities to enable them to be effectively used with voice input driven applications such as voice recognition, voice based dialing, or voice based execution of application functions. Further, specific models or types of headsets are becoming preferred by users, and those users may wish to utilize their headset with a variety of audio or voice gateways. This means that the user must often re-configure the gateway for use with the headset or find a means of migrating personal data to the new gateway (as is the case when a user changes their mobile phone).

What is desired is a system, apparatus, and method to enable a user of a headset and audio or voice gateway to more effectively discover and utilize applications resident on, or that may be installed on, the gateway or on a server in communication with the gateway over a communications network. It is also desired to have a headset that can interact with an audio or voice gateway that does not require a physical interface to issue commands and receive data or responses to those commands from the gateway or an application. Embodiments of the invention address these problems and other problems individually and collectively.

SUMMARY

Embodiments of the present invention are directed to headsets used with audio or voice gateways, and to software applications that may be used with such headsets and gateways. In some embodiments, the present invention is directed to a headset for use with an audio or voice gateway (and to a method of using the same) to enable a user to discover and interact with applications resident on the headset, gateway, or on a network accessible by the gateway. In these embodiments, the headset may function as an application platform for the control and execution of the applications, thereby providing a user with access to a variety of value added services. The headset typically communicates with the audio or voice gateway using a wireless technology, with voice inputs from the user being used to execute the functions of a desired application or obtain the benefits of a desired service.

The headset and gateway may form a system with the invention providing a method for the provisioning of a communications capability between the headset and gateway, the installation of a voice input driven application on the gateway, and the discovery, installation, and execution of applications resident on the gateway or on a network capable of communication with the gateway. In some embodiments, applications or data may be pre-installed onto the headset to enable the headset to interact with an audio or voice gateway, or with a specific application resident on the gateway or on a network. Further, the pre-installed applications or data may be transferred from the headset to the gateway to permit execution of an application on the gateway under the control of the headset, or configuration of a feature or function of the headset or gateway. In some embodiments, and depending upon the capabilities of the headset and/or gateway, the headset may transfer data or metadata to the gateway that identifies a location of an application (e.g., a voice input driven interface or application) that may then be accessed by the gateway and installed on the gateway. In another embodiment, an application or data may be transferred to the headset from the gateway to enable the headset user to store personal data or configuration files on the headset and use that data or files with a different gateway.

In one embodiment, the present invention is directed to a headset for use with an audio gateway, where the headset includes a data storage medium, an application stored in the data storage medium, and a file stored in the data storage medium, the file including data or metadata identifying a network location of the application, wherein the headset is configured to communicate with the audio gateway and to determine available methods for transferring or causing the transfer of the application to the audio gateway.

In another embodiment, the present invention is directed to a method of providing a service to a user, where the method includes establishing a communication channel between a headset and an audio gateway, determining the data transfer capabilities of the audio gateway, communicating the data transfer capabilities of the audio gateway to the headset, transferring an application to the audio gateway, wherein the method of transferring the application is determined in response to determining the data transfer capabilities of the audio gateway, and installing the application on the audio gateway, wherein execution of the application provides the service to the user.

In another embodiment, the present invention is directed to a computer-readable medium having instructions stored thereon, wherein when executed by a processor the instructions implement a method of providing a service to a user, where the method includes establishing a communication channel between a headset and an audio gateway, determining the data transfer capabilities of the audio gateway, communicating the data transfer capabilities of the audio gateway to the headset, transferring an application to the audio gateway, wherein the method of transferring the application is determined in response to determining the data transfer capabilities of the audio gateway, and installing the application on the audio gateway, wherein execution of the application provides the service to the user.

Other objects and advantages of the present invention will be apparent to one of ordinary skill in the art upon review of the detailed description of the present invention and the included figures.

Figure 1:
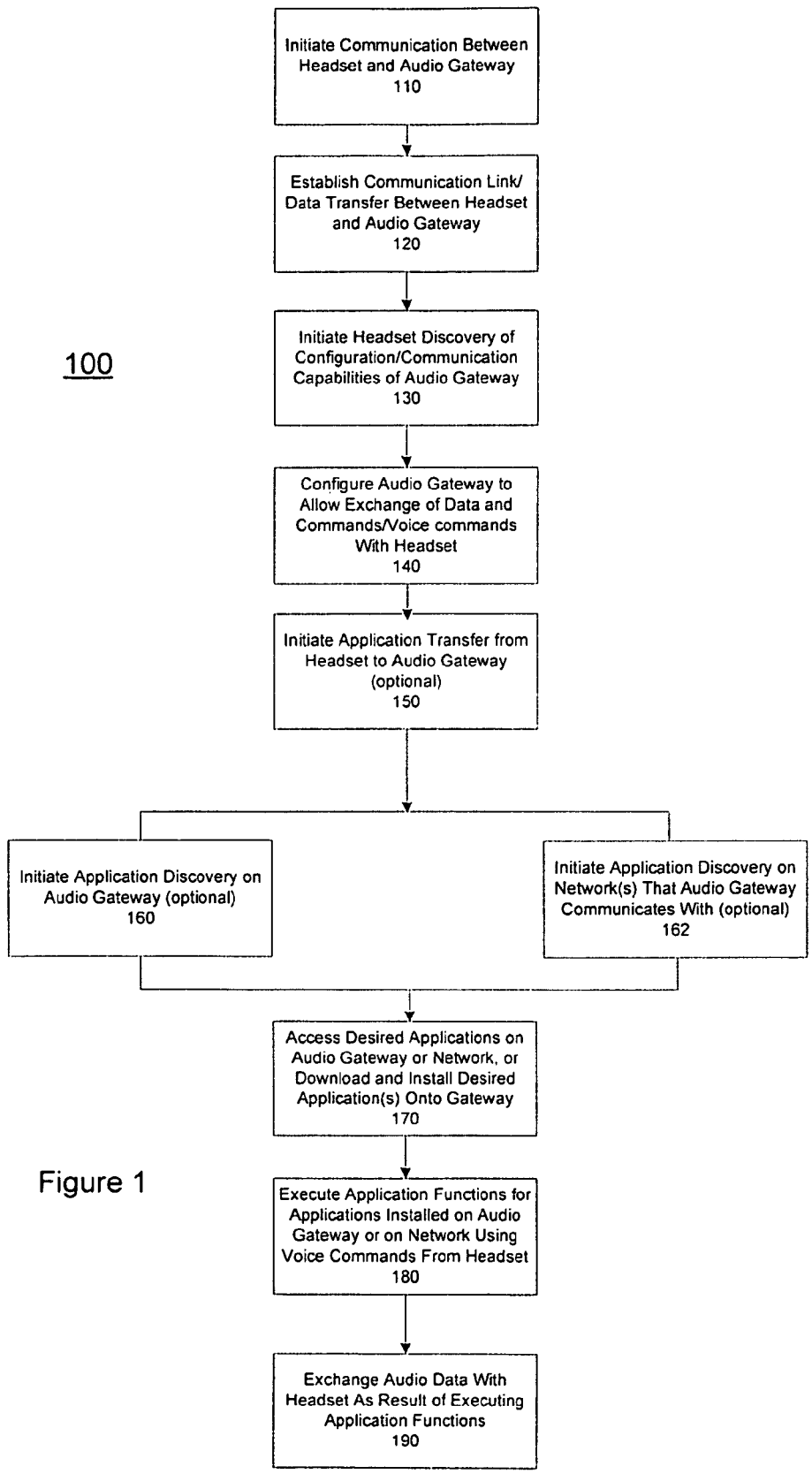
FIG. 1 is a flowchart illustrating an exemplary method for enabling a headset to interact with an audio gateway to execute a voice input driven application, in accordance with some embodiments of the invention.

Note that in the drawings, the same reference numbers identify identical or substantially similar elements. To easily identify the discussion of any particular element or act, the most significant digit or digits in a reference number typically to the figure number in which that element is first introduced (e.g., element 110 is first introduced and discussed with respect to FIG. 1).

DETAILED DESCRIPTION

Before proceeding to describe one or more embodiments of the present invention, and to assist with providing a better understanding of the invention, it may be useful to define some terms that will be used in describing the inventive system, apparatus, and method. In the context of the present invention:

in some embodiments, a "voice gateway" or "audio gateway" refers to a device that is capable of communicating with a headset using voice or audio signals and transferring data and/or audio signals to a headset via a wired or wireless channel, and which may be used to transfer data and/or audio signals to another device over a communications network. The gateway may also be used to execute an application resident on the gateway or to control the execution of an application resident on a device connected to the gateway by a communications channel;

"service discovery" refers to a process by which a first device (e.g., a headset) determines the communications and/or data transfer capabilities of another device (e.g., an audio gateway), with one result being that the first device can then know which communications and/or data transfer modes may be used for the installation of applications on the second device; and a "service" or "value added service" refers to the result of executing an application, such as a software program or applet, or to exercising some function or feature of a device. The result is to provide a user with value, in the form of information, data or another form of output that is of use to a consumer.

Although in the description that follows, some of the embodiments of the present invention will be described with reference to use of a wireless headset, it is to be understood that both wired and wireless headsets may be used in embodiments of the invention, unless use of one or the other type of headset is precluded by the application or situation being described.

In some embodiments, the present invention is directed to a system that includes a headset and an audio or voice gateway, although embodiments of the invention include the headset as a separate element as well. The headset may be a wired headset or a wireless headset and may include a data storage element, such as a memory. The headset may include one or more software applications, data files, or metadata stored in the memory. In one embodiment, the headset and gateway establish communications and after service discovery of the capabilities of the gateway, the headset then transfers (or causes the transfer of) a software application, data file or metadata to the gateway. For example, the application may be downloaded from the headset and installed, then executed under control of voice commands from the headset. In another example, the application may be accessed from a network location identified by the headset (e.g., via the metadata) and then downloaded to the gateway. In the case of a data file, the file may be used to configure the gateway for a desired operation or function.

In one embodiment, the application or data file may provide a control interface (e.g., a "dashboard") for the headset that would not normally be accessible using the gateway. This may enable a user to configure certain services or functions of the headset using the gateway and the gateway's user interface (which in some cases may provide greater ease of use or other benefits to a user). Further, the headset may transfer an API (application programming interface) to the audio or voice gateway and expose the API through the gateway to provide a way for applications (either on the gateway or on a device connected to the gateway by a communications network) to access and share the headset's resident application, sensors, controls, functions, services, etc. Note that the output of an application or the benefit provided by a service may be audio signals or data, and the data may be transformed to an audio stream (via text-to-speech or another suitable technology depending on the form and content of the data) for playback to the user. The playback of the audio stream or transformed data may be through the headset or through another device, such as a phone or computer. In this way a user may select a device or playback mechanism that is best suited to their needs, which in some cases may depend upon the content of the audio stream or data, the features or user interface of the possible playback devices, etc.

In one embodiment, the downloaded application may be one that enables voice commands from the headset to be used to control certain functions or operations of the gateway. Such functions or operations may include initiating a search using the gateway as a connection to the Internet or another network, placing a call, retrieving data stored on the gateway or from another location, accessing a web service or other network resident function, etc. The downloaded application may also enable use of voice commands to control the execution of the functions or operations of a second application, where the second application is resident on the gateway or on a server or other network element connected to the gateway by a communications channel. Further, the downloaded or accessed application may be one that performs a desired function under the control of the headset or gateway.

Thus, in some embodiments, the headset is configured to have a voice based interface to the audio or voice gateway to enable the headset to control the access of data from the gateway or a connected device, and to translate that data into an audio stream that is sent to the headset and heard by the user. In such an embodiment, a physical interface (such as a keypad or control buttons) would not be required to issue commands and receive a response. Instead, voice commands are used to control and navigate the functions or operations of an application installed on the gateway or on a server coupled to the gateway by means of a communications network. In some embodiments, the gateway processes the voice input to receive an instruction set (e.g., a command for an application or metadata) from the headset, retrieve data requested from a source, and communicate the requested data over a wired or wireless audio channel to the user.

Typically, a wireless, hands-free headset utilizes two types of input mechanisms for controlling the operation of the headset and any applications with which it interacts. One of the inputs (e.g., a physical interaction or application of pressure on a button or control) requires a user to use their hand to physically interact with the headset. A second input (e.g., voice) requires a user to speak into the microphone of the headset to accomplish tasks or actions. As mentioned, and as will be described in greater detail, in order to overcome some of the disadvantages of such a dual-input mode user interface, in one embodiment of the present invention, the headset transfers (or causes the transfer of) a software application to the audio or voice gateway. In some embodiments, the application enables voice inputs to be used to issue commands for controlling functions or operations of the gateway, of applications resident on the gateway, or of applications resident on a device in communication with the gateway over a communications network.

Note that the voice input interface application (as well as others a user may want to use) may be stored on the headset or accessed from another source and downloaded to the gateway. Initiation of the download process may be under the control of the headset, for example by transferring data or a message to the gateway identifying a desired application and its location. The gateway may then connect to a network resource (either directly via a wireless network, directly via a wired network, or via a combination of a coupled wireless network and wired network) and access the desired application. The application may be executed over the network or downloaded to the gateway and executed on the gateway, thereby providing a desired function, service or feature to a user.

In some embodiments, the present invention includes a method for enabling wireless binary install operations to and from a wireless headset. In such a method, a wireless headset may use a transport medium such as Bluetooth wireless technology to setup connections for sending and receiving data. The data may include binary, compiled data that can be executed on the audio or voice gateway. The headset may act as a control point when interfacing with other devices such as a mobile cellular phone or a computer. The control point enables the user to create and customize their mobile communication experience by wireless application download or over-the-air data transfer.

In some embodiments, the headset may use Bluetooth wireless technology as the data transfer mechanism, and may use data transfer profiles for data exchange from the headset to the gateway and for controlling certain functions or operations of the gateway. These profiles can be of any suitable protocol or format, including, but not limited to, Object Push Profile (OPP), File Transfer Profile (FTP), Human Interface Device Profile (HID), Personal Area Networking Profile (PAN), Wireless Application Protocol Bearer (WAPB) Profile. Voice data is typically carried via Hands-Free and Headset Profiles (HFP and HSP). Typically, once both devices are bonded and paired, data and voice channels are opened concurrently.

In some embodiments, a wireless headset uses a wireless transport mechanism (e.g. Bluetooth) to discover services available on the gateway or accessible by the gateway, and uses the appropriate negotiation protocol or profile to communicate data and receive information regarding the capabilities of the gateway. In some cases, the headset may store information regarding the capabilities of the gateway and continuously update its knowledge of the gateway's characteristics and specifications through execution of an application that is loaded onto the gateway.

Once a voice command interface application is loaded onto the audio or voice gateway, the gateway may behave as a wireless, portable modem that is capable of data exchange and communication with the headset. The headset may use voice commands for control of the application and gateway functions (via an applet, for example). The voice command interface application executing on the gateway parses and processes the voice commands. Once processed, the voice command may be responded to with the requested information, or confirmed (e.g., an audio reply may be sent to headset).

As an example, a mobile phone under the control of the headset may access an application resident on a network server, where the server is capable of communication with the phone via a device that facilitates data transfer between a wired and wireless network. In other cases, an application may be resident on the mobile phone. Voice commands from the headset are communicated to the phone and used to execute desired functions of the application, whether the application is on the phone or on a server that is part of a network in communication with the phone. As the user speaks, the process of communicating with the mobile phone to provide the desired service is initiated. For instance, a user can be driving and using the headset, which is in communication with the mobile phone on which the application is loaded (or the phone may be in communication with a server on which the application is executing). When the user says "directions", a confirmation is received and a response such as "where do you want to go?" can be provided. The user can then state an address, and in return receive a message (or a tone) indicating that the directions are available. The user can then say "begin", and a first direction may be given to the user. The user can prompt the application for further directions by stating "next". The application may be configured to act on key words to provide directions without the user needing to look at the phone or physically interact with the phone. In an embodiment, once the application has the address, the directions may be acquired by the application from a network (typically the Internet). Note that acquiring driving directions is just one example of a service that can be delivered to a user in this manner. Further, for the example of driving directions or another application, the directions or other output could be provided without additional user prompts over a phone call or suitable streaming audio service (e.g., playback from an Internet web-site).

In general, embodiments of the invention include, but are not limited to, being implemented as part of the following operations, actions, methods or processes, with each such operation, action, method, or process capable of being implemented in whole or in part as an apparatus or system that includes a processor executing a set of instructions, as a set of instructions contained on a computer-readable medium, among other embodiments:

performance of service discovery to determine the communications and/or data transfer capabilities of an audio or voice gateway to enable a headset to determine how to transfer (or cause the transfer of) an application to the gateway;

control of the transfer of a voice input or voice recognition application, or other application or service onto the gateway and installation of the application on the gateway based on the results of the service discovery;

use of voice inputs from the headset to control the execution of functions of the gateway and of applications resident on the gateway or accessible by the gateway over a communications network;

discovery of applications resident on the gateway or accessible by the gateway over a communications network; and transfer of a dashboard application from the headset to the gateway to enable a user to configure functions or capabilities of the headset using the gateway user interface (s).

Figure 9:
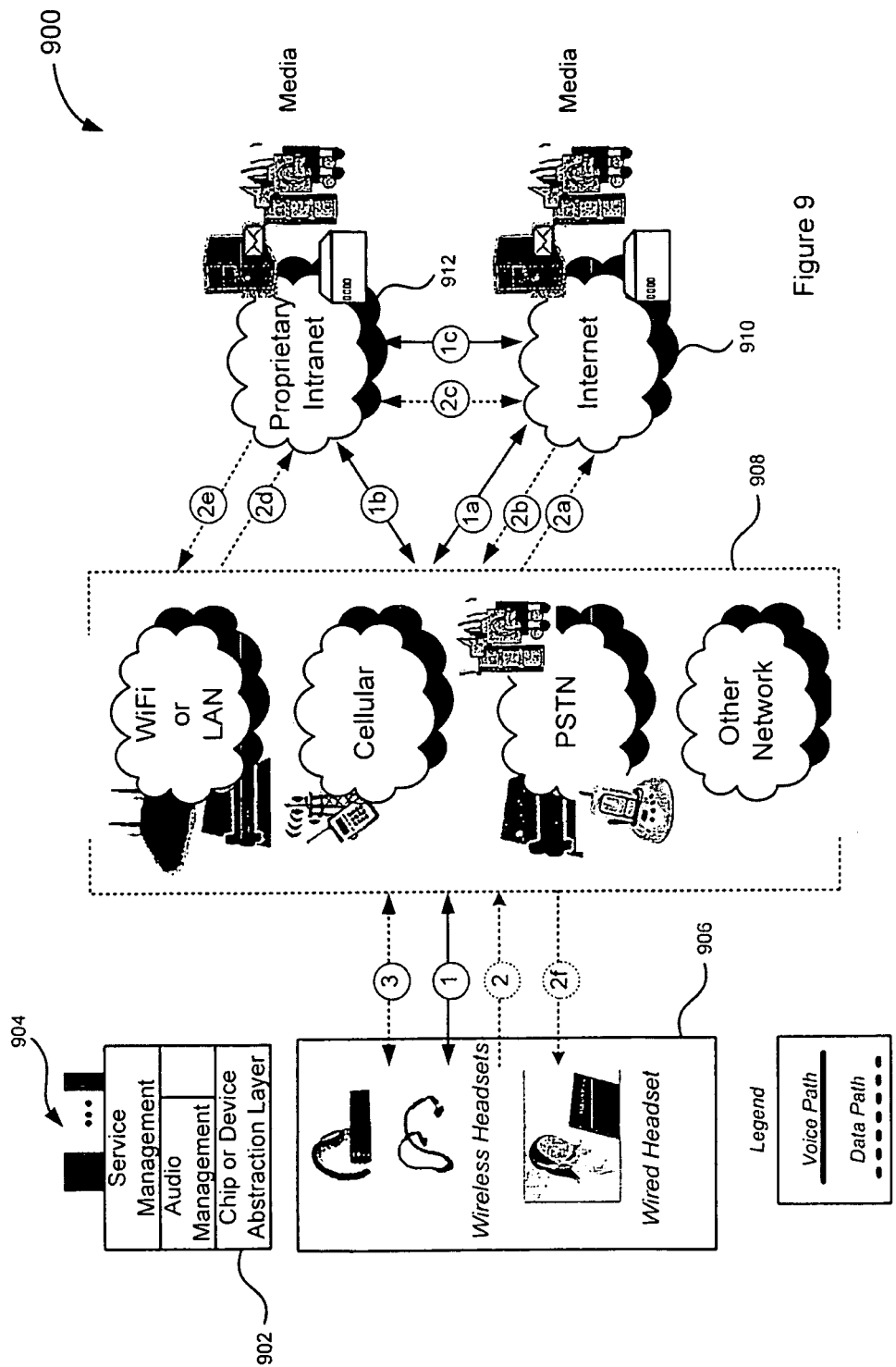
FIG. 9 is a block diagram of a headset and audio gateway system, in accordance with some embodiments of the present invention.

FIG. 9 is a block diagram of a headset and audio gateway system 900, in accordance with some embodiments of the present invention. System 900 may include one or more communications networks 908, which may include WiFi networks or local area networks (LANs), cellular networks, public switched telephone networks (PSTNs), and any other known wired or wireless communications networks. Wireless networks include but are not limited to Bluetooth networks, WiFi networks, WiMAX networks, etc. Headsets 906, which include wireless headsets and wired headsets, communicate through networks 908 with other networks, such as proprietary intranet 912 and Internet 910. A headset application management platform 902, as further described with reference to specific embodiments herein, facilitates the execution of various user applications 904 that provide enhanced functionality and flexibility to the headsets 906, the headset user and other components of system 900. User applications 904 may include, but are not limited to, an autodial application, a voice recognition application, and an application for downloading services to remote devices. Headset application management platform 902 may include a chip or device abstraction layer, an audio management layer, and a service management layer.

The chip/device abstraction layer is a layer that provides a consistent API that sits above the internal DSP/Processor and lower level device functions. This provides a constant functional API to the upper layers regardless of the underlying processor or processor/DSP functions. In the situation where one processor/DSP doesn't provide certain features of another processor/DSP, the feature can either be written for local emulation or marked/flagged as not available. The audio management layer provides functional management of the audio features of the headset. By placing this above the device abstraction layer it is generally possible to have instances of the noise suppression or other audio features independent from the processor/DSP. The service management layer provides the basic API for application and service development. Functions exposed at this layer may include button presses, sensor changes, battery level indications, timers, display interfaces, network interfaces, etc An example of the operation of the system 900 will now be described with reference to the circled numbers and arrows in the diagram of FIG. 9. In this example, the figure shows three paths or network connections:

1. Path (1) is the standard audio path that can be used for voice recognition services or a standard telephony function such as a phone call, etc.;
2. Path (2) can be thought of as a half-duplex data only connection. In this case non-voice (metadata and/or data, such as a URL, etc) requests can be sent through the internet and serviced by a carrier, corporate partner or other entity. The return path is the response to the request; and
3. Path (3) is a full-duplex data only path that might be used for streaming data services, VoIP or other near real-time services.

Note that the headset can be connected via an audio path for pure audio services, connected to both an audio and data path for mixed mode services, or connected directly to a network for other data only services.

As shown at path 1, a voice command may be issued from a headset 906 through a voice or audio gateway (which will be described in greater detail with reference to the other figures) to a communications network 908. The voice or audio gateway can be a device capable of communication with (or resident on) a network 908, or included as part of wired or wireless headset 906. A voice or audio gateway may support digitized voice, VoIP (voice over Internet Protocol), or traditional voice services. A voice or audio gateway may be comprised of a PC, WiFi Access Point, Cellular phone, Wireless home phone, etc. The voice or audio gateway may also serve as a data gateway for some services. Referring to 1*a*, 1*b*, and 1*c* in the figure, if the voice command is co-processed by a network 908-based service it may be transported through the Internet or directly to a service of the proprietary network 912. If the service is a voice-based or audio service, voice or audio is returned to the user. An example is a request for streaming music from a back-end library, a music library located in the home, etc. Another example is a voice-based messaging service. If the voice command is a request for data (from either a back-end service or a service on a co-located network) a data path is established through a data gateway. The data gateway may be included as part of a voice or audio gateway, or be implemented as a separate entity such as a WiFi Access point.

Referring to 2*a*, 2*c*, and 2*d* in the figure, a data command (path 2) issued from headset 906 or generated as a result of a command issued by headset and processed by a voice, audio, or data gateway, or other device is delivered to a back-end server. The data command could be a request for an application or other service, metadata describing a location of an application or service, or metadata defining a command or instruction for an application or service. Data commands are not limited to any standard based protocol and may be a proprietary protocol. This includes using the inventive platform to install a protocol that can run over Bluetooth as only a transport, or a standard protocol such as SMS, HTTP, WAP Push, etc. The service could be provided through the Internet 910 or directly to the proprietary network 912.

Referring to 2*b*, 2*e*, and 2*f* in the figure, the requested service, data or application output is returned to headset 906 through the data network (e.g., the Internet 910 or the proprietary network 912 directly). A data service may be any service that could reside on the headset 906, voice or audio gateway, data gateway, or another device such as a DVR. The service may also be a service that is shared between the headset 906 and the voice or audio gateway, or data gateway, such as headset configuration management or service management. A shared service may include, for example, a service that is shared or allows voice-driven command and control of functions of headset 906 or other device including the voice or audio gateway, or data gateway, or home services or devices such as music players, DVRs etc.

The data service can be delivered using any device that requires command/control. This could include an applet on headset 906 alone (such as a voice-driven interface where different languages are requested, a streaming music interface, or to remotely program a DVR, etc). Alternatively an application can be installed on a device to allow the device to directly accept voice-driven commands from headset 906 or to provide a shared service between headset 906 and the device (such as using the device to control headset features and visa-versa).

When wireless communications networks 908 are used, such as a cellular network that may be subject to signal fade, packet or signal loss, a shared service between headset 906 and the voice or audio gateway, or data gateway may be used to buffer the requests and send them as network 908 becomes available. Headsets 906 can be connected to a voice, audio or data gateway either directly or through a wired interface. Where wireless headsets 906 are used, such headsets will typically support multi-pairing or multi-device connection when interfacing with more than one data, voice, or audio gateway.

A wired headset 906 may include a handset that is equipped with data management platform 902. Further, in some embodiments headset 906 may be equipped with a noise suppression system or service, such as one developed by Aliphcom, Inc. Aliphcom's proprietary microphones and noise suppression techniques provide better performance for voice-based services used with headsets. In contrast, other noise suppression systems used in headsets often cause too severe voice signal degradation to effectively support such services.

FIG. 1 is a flowchart illustrating an exemplary method 100 for enabling a headset to interact with an audio gateway to execute a voice input driven application, in accordance with some embodiments of the invention. Note that not every step or stage depicted in the figure may be implemented in every embodiment of the invention, and that other steps or stages may be added to, or substituted for, those depicted without departing from the underlying concept of the invention.

In the exemplary method or process illustrated in FIG. 1, a headset and audio gateway are used to enable a user of the headset to access a desired application and control the execution of the functions of the application. Note that with reference to the figures and the embodiments of the invention that will be described, an audio gateway refers to an audio or voice gateway, and may include or be part of the functions of a data gateway. The headset may be a wired or wireless headset. In the case of a wireless headset, the headset may communicate with the audio gateway using any suitable technology or protocol, including but not limited to, Bluetooth, infrared, optical, or other radio frequency technology. The "headset" may also be a speaker phone or other form of audio input and playback device that is capable of communication with the audio gateway. The audio gateway may be one or more of a mobile phone, personal digital assistant (PDA), laptop computer, desktop computer, or other communications device. The audio gateway may also be a game console or device for which a user desires to have the ability to control some or all of the functions or features of the console or device by using voice commands or other signals generated by the headset. The headset and audio gateway may be separate devices or units, or implemented as part of the same device or unit. Further, the headset may be connected to one or more such devices and be used to control features or functions of each such device independently. This may be accomplished, for example, by using an application resident on the headset to switch between the devices and thereby control the desired device.

Note that to improve the operation of the headset and audio gateway system, the headset may incorporate noise cancellation, noise suppression, or voice enhancement technologies. An implementation of a speech sensor and associated components and signal processing that is suitable for use in a headset that may be used as part of the present invention is described in U.S. Pat. No. 7,246,058, issued Jul. 17, 2007, entitled "Detecting Voiced and Unvoiced Speech Using Both Acoustic and Nonacoustic Sensors", and the contents of which is hereby incorporated by reference in its entirety.

Continuing with reference to FIG. 1, in stage 110, communication is initiated between the headset and the audio gateway. This may be accomplished by the headset sending a request to the gateway, the gateway sending a request to the headset or another suitable method. Typically, communication is initiated in accordance with a predefined protocol that is compatible with the communications technology being utilized. In some embodiments, this may be part of a "pairing" or similar operation conducted between the headset and gateway. For example, the headset and gateway may exchange a password, encryption key, or other data that may be used to activate or configure a communications capability. At stage 120 a communication link and/or data transfer capability is established between the headset and audio gateway. This may involve selection or negotiation of a communications protocol, access and download of a configuration file for the headset or gateway, or other similar process. The result is typically the provisioning or configuration of a communications channel between the headset and audio gateway, thereby enabling the transfer of voice communications and/or data between the headset and gateway.

At stage 130 the headset initiates a "service discovery" function with regards to the audio gateway. The service discovery function enables the headset to become aware of the configuration and/or communications capabilities of the gateway. This may be accomplished by any suitable method, such as accessing a configuration file stored in the gateway, sending data from the headset to the gateway to determine if the gateway responds, use of a predefined protocol, etc. One goal of this stage is to determine what communications capabilities and/or data transfer methods are supported by the headset and gateway. This may include determining the user interfaces, data input mechanisms, messaging capabilities, or communications protocols supported by the headset and gateway. This information may be used to determine how to transfer or how to cause the transfer of a desired application to the gateway under the control of the headset.

At stage 140, the audio gateway is configured to allow the exchange of data and commands (typically voice commands) with the headset. This will typically involve configuring a voice recognition application (e.g., an application that can process voice inputs and output commands or instructions for the control of the application or of another application) resident on the gateway to permit the exchange of voice commands from the headset as inputs. The inputs are interpreted or recognized by the voice recognition application and used to control the execution of a function of that application or of another application, where the other application may be resident on the gateway or on a server connected to the gateway by a suitable network. Note that in some embodiments, the voice recognition application may be resident on a server that is coupled to the audio gateway by a communications network. In such cases the voice recognition application may be downloaded to the audio gateway and installed before the application is configured to enable communications with the headset.

In some embodiments, the voice recognition application may be resident on the headset instead of being on the audio gateway or a server located on a network coupled to the gateway by a communications network. In addition to, or instead, a configuration file or other relevant data may be stored on the headset and used to configure the headset or configure the gateway after being transferred from the headset. As shown at stage 150, if desired, a voice recognition application may be transferred from a storage element on the headset (e.g., flash memory) to the audio gateway, followed by installation and configuration of the application on the gateway.

Whether the voice recognition application is initially resident on the headset, audio gateway, or on a server the result of stage 140 or 150 is to enable a user to utilize voice commands or instructions to control the execution of functions or operations of the gateway, an application resident on the gateway, or an application resident on a server in communication with the gateway over a communications network.

After configuration of the headset and audio gateway to enable use of voice commands, a user may optionally initiate discovery of applications or data resident on the gateway (stage 160) or accessible via a network that the gateway is capable of communicating with (stage 162). Such applications or data may be "discovered" by executing a discovery function using voice inputs from the headset, for example. The object of the discovery function is to determine those applications, features, or functions resident on the audio gateway or a network connected to the gateway (e.g., a corporate network, the Internet, or another public or private network) that may be utilized with the headset to deliver services or data to the user. Typically, these will be applications whose functions can be executed using voice inputs, although they may provide outputs in audio or data format. The discovery process may involve accessing application or data definition files and comparing certain data or application descriptions to those of a configuration file that defines the capabilities of the headset or gateway, for example. The discovery process may also include searching a network for applications that satisfy certain requirements and hence are compatible with the headset and gateway. Examples of such applications or functions include, but are not limited to, banking, directions or mapping, searching databases, controlling a device or system (e.g., an electronic component), audio or music file acquisition and playback, voice activated dialing using data obtained from a personal data file or phonebook, etc. The discovered applications or functions may be made known to the user by providing an audio stream listing the information, providing a menu or list for display on the audio gateway, or another suitable method.

After discovering the available applications or data resident on the audio gateway or on a server or network that the gateway is capable of communicating with, the user may select the desired application(s) or data. This may involve accessing the desired application or data on the audio gateway or network, or downloading the application or data to the gateway where is it installed and made available for access by the user of the headset (stage 170). Applications are executed or data retrieved using voice inputs or commands provided by the user from the headset (stage 180). This enables the headset user to execute application functions or retrieve data using voice commands. In response to executing the commands or retrieving the data, the audio gateway provides an audio stream or signal to the headset as the output of the command or operation (stage 190). In some embodiments and depending on the application or data involved, the output may be a response to a question, the results of a search query, the value of specified data, playback of an audio file, etc.

Figure 2:
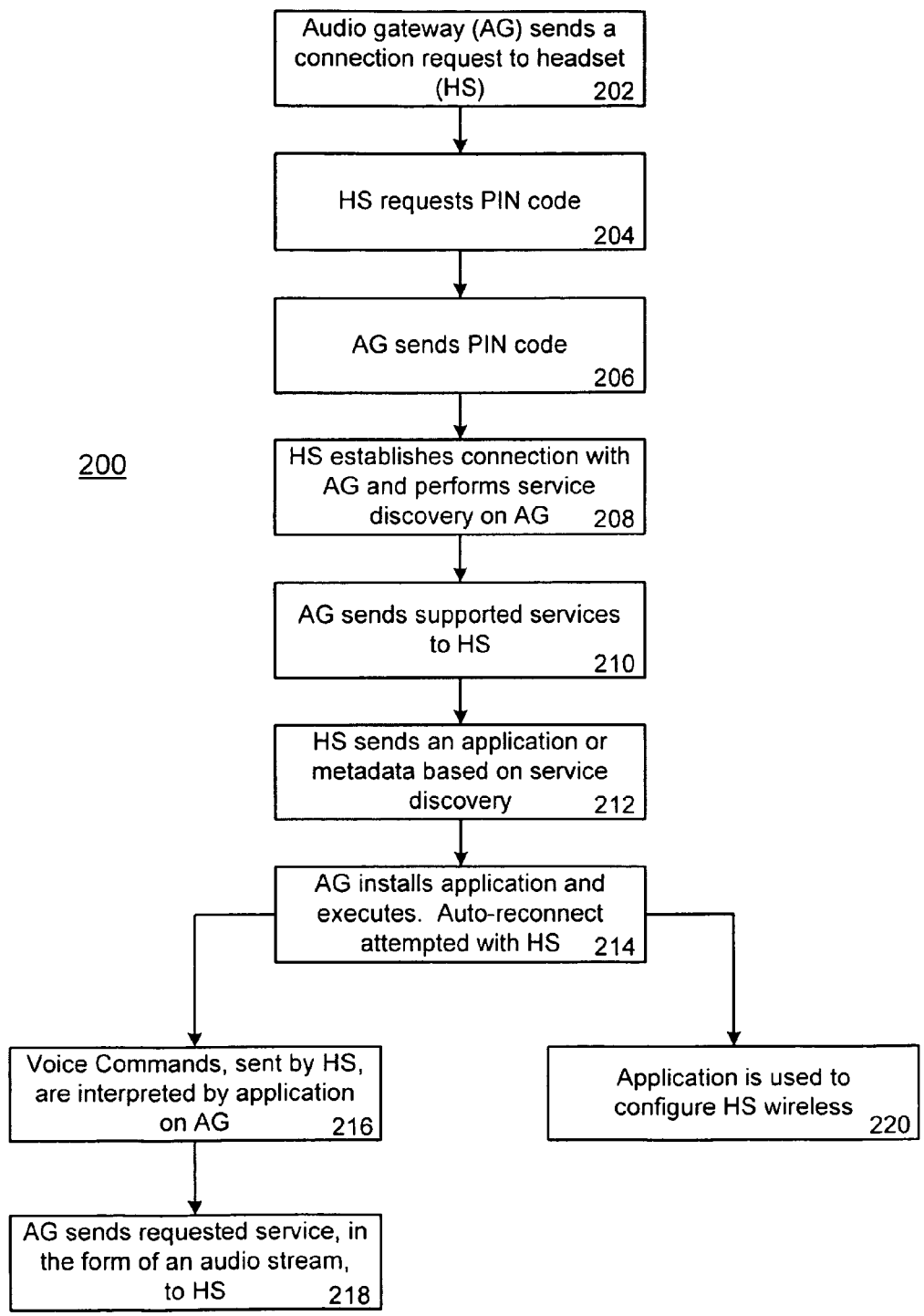
FIG. 2 is a flowchart illustrating a second exemplary method for enabling a headset to interact with an audio gateway to execute a voice input driven application, in accordance with some embodiments of the invention.

FIG. 2 is a flowchart illustrating a second exemplary method 200 for enabling a headset to cooperate with an audio gateway to execute a voice input driven application, in accordance with some embodiments of the invention. As shown in the figure, at stage 202, the audio gateway (AG) sends a connection request to the headset (HS). Note that this stage may occur as part of the gateway-headset pairing operation that is part of a Bluetooth or other communications protocol or configuration process. At stage 204, the headset requests a personal identification number (PIN) or other form of security/authorization code in response to the connection request. Note that in some embodiments, the PIN code may be pre-programmed and stored in the headset and then compared to the data received from the gateway. At stage 206, the audio gateway sends the PIN code or other form of security or access control data to the headset. Once the security or access control data is verified, the headset, at stage 208, then establishes a connection with the audio gateway and performs service discovery on the audio gateway.

As described with reference to stage 130 of FIG. 1, service discovery may involve determining the services, communications, or data transfer capabilities of the gateway that are compatible with the headset. A data listing of the services or capabilities that are compatible with the headset are then sent to the headset by the audio gateway, as indicated at stage 210. Depending upon what services or capabilities are supported by the audio gateway, the headset may transfer an application stored on the headset to the gateway, as shown at stage 212. In addition to, or instead of sending an application to the gateway, the headset may send metadata such as an AT command or URL to the gateway (as will be described with reference to FIGS. 3-5). The AT command or URL may then be used by the audio gateway to access and download a desired application (where the AT command or URL provide information that identifies the application and/or its location on a network). The AT command or URL may be provided in situations in which download of the application from the headset to the audio gateway is not supported or is otherwise made inefficient due to the services and capabilities of the gateway.

At stage 214, the audio gateway installs the application (whether received directly from the headset or obtained from another source as a result of a command or metadata from the headset), and executes the application. Note that upon receipt of the application or metadata, the audio gateway will typically automatically attempt to reconnect with the headset (if not already connected).

At this point, and as an example, one of two process paths may follow. One path is shown at stages 216 and 218, where voice commands sent by the headset are interpreted by the application on the audio gateway (stage 216) and used to initiate execution of a specified function or operation. This may occur as the result of installation on the gateway of a voice recognition application or may be part of another type of application that is configured to utilize a voice input user interface. For example the commands can include commands to get directions, take down notes, find a business, or anything else that can be communicated to the audio gateway with a key word or sequence that the gateway can respond to. In response, the audio gateway sends the requested service or application output to the headset in the form of an audio stream (stage 218).

A second process path is shown with reference to stage 220. In this path, the installed application is used to configure certain features of the headset and/or gateway. For example, this process can be executed when a user initializes a new headset, in which case an application can customize the headset for language, ring tone, audio tone, etc. As an example, the application installed on the gateway may be a "dashboard" application for the headset that enables use of the gateway user interface(s) to configure certain functions or features of the headset.

Figure 3A:
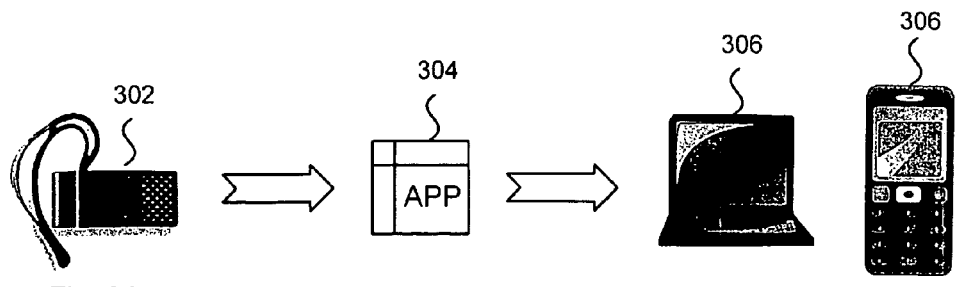
FIGS. 3A, 3B, 3C, and 3D are block diagrams illustrating a first set of use cases for a headset and audio gateway system, in accordance with some embodiments of the present invention.

FIGS. 3A, 3B, 3C, and 3D are block diagrams illustrating a first set of use cases for a headset and audio gateway system, in accordance with some embodiments of the present invention. FIG. 3A shows a case in which an application 304 is stored on a headset 302. The application may be stored in any suitable form of data storage, for example, flash memory. Application 304 is transferred from headset 302 to a device 306 capable of communication with, or configured to communicate with headset 302. Device or audio gateway 306 may be any suitable device capable of receiving an application from headset 302 and executing that application. For example, device 306 may be a global positioning system (GPS) device, a personal computer (PC), a mobile phone, or other form of audio gateway.

In some embodiments, configuration of certain functions or capabilities of headset 302 may be managed or controlled by device 306. In such a situation, transferred application 304 may be an application that provides a "dashboard" function for headset configuration. This enables a user to configure certain functions or features of headset 302 using the user interface(s) of device 306. In such a case, confirmation of configuration changes, etc. may be provided by audio or visual responses. Note that in addition to being obtained from data storage on headset 302, application 304 may be downloaded to device 306 by any suitable method, including, but not limited to, wireless or wired Internet (in which case the application may be obtained from a device coupled to device 306 by a suitable communications network), a data storage device, compact disc, etc. Note also that application 304 may be an application that enables voice inputs from the headset to be used to control aspects of the operation of gateway 306 or the execution of another application. Device 306 is typically capable of communicating with headset 302 via a suitable communication protocol such as Bluetooth, for example, so that an application or data stored on headset 302 may be transferred to audio gateway 306 via a wireless communications technology.

Note that in some embodiments described herein, connected devices 306 are audio gateways, but implementations of the present invention are not limited to device 306 acting as an audio gateway. Audio gateways may include, but are not limited to, personal computers (PCs), PDAs, mobile phones, or other devices capable of wired or wireless communication via known networks and protocols. For example (and as described in part with reference to FIGS. 1 and 2), in some embodiments, the application may be sent to an audio gateway using Bluetooth as a transport mechanism, after service discovery has been performed by the headset to determine which protocols are supported by the gateway, whether the gateway can receive a certain type of application, etc. In some embodiments, the application may be sent via Bluetooth transports and protocols, where within Bluetooth transports are multiple protocols. For example, an OBEX protocol (which is an object push profile or OPP) may be used. A file transfer protocol (FTP) may also be used.

In some embodiments, the audio gateway or device 306 may include noise cancellation or signal enhancement capabilities. This may be important in some use cases as inferior audio quality has hampered voice dialing and the provision of other voice services in the past. In some embodiments, improved audio quality may be coupled with management of voice service requests in an asynchronous manner. For example, voice requests, commands, or instructions from the headset may be stored on device 306 for use with an application on the device or delivery to an application over a connected network at a later time. Similarly, responses to such requests, commands, or instructions from a server or application on a network may be stored on device 306 for delivery to the headset at a later time. This reduces packet loss and connection loss when the voice services do not need immediate attention. Further, as mentioned, headset 302 may include noise cancellation, noise suppression or signal enhancement functions that provide increased clarity for the voice commands issued by the headset and enable more effective interaction with the voice recognition application or interface being used on device 306.

Figure 3B:
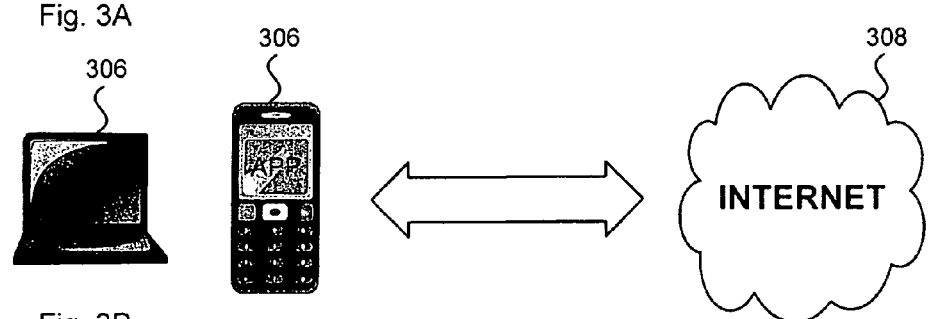

After application 304 is stored on an audio gateway or device 306, it is executed on the audio gateway or device. Application 304 typically provides a service, in which case audio gateway or device 306 may be configured to have a connection to the Internet or another network 308, as shown in FIG. 3B. In the case of device 306 being a PC, high speed access to the Internet may include an Ethernet connection.

Once application 304 has established an Internet or other network connection, audio gateway or device 306 can reestablish its connection with headset 302. Once headset 302 is aware the connection has been reestablished, it typically assumes that the connection is successful. At this point headset 302 is able to control some or all of the functions and operational features of audio gateway or device 306, or of an application that may use voice inputs. For example, a user of headset 302 may issue a voice request or command, such as a request for directions, a request for a notepad, an inquiry that may be used as part or all of a search query, or another form of command that requires audio gateway or device 306 to the access the Internet or other network 308 and to provide some sort of service through headset 302.

Figure 3C:
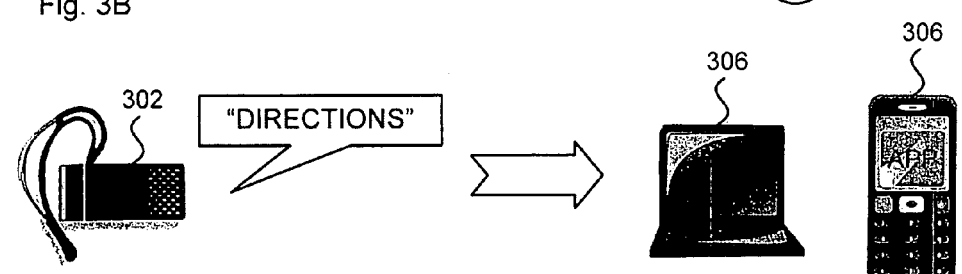
Figure 3D:
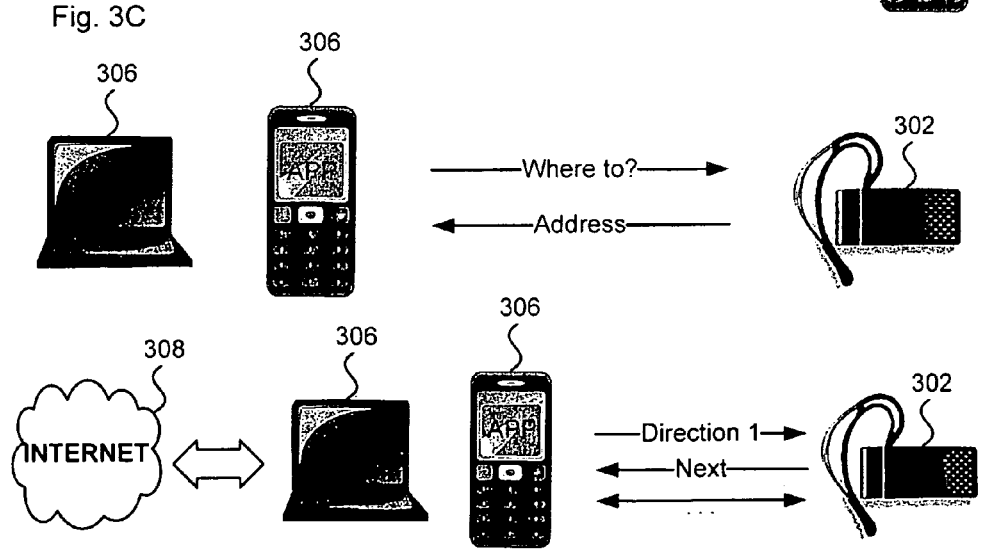

FIG. 3C shows an example in which headset 302 transmits a request for directions to an audio gateway 306. The voice command "directions" in this example causes execution of an application function that assists the user to obtain the desired directions. As shown in FIG. 3D, once audio gateway 306 is in a mode in which directions may be obtained, it may negotiate a handshake with headset 302. For example, audio gateway 306 may ask "where do you want to go?" and the user can make a voice response via headset 302 to obtain the directions and if desired, step through each portion of those directions.

Figure 4A:
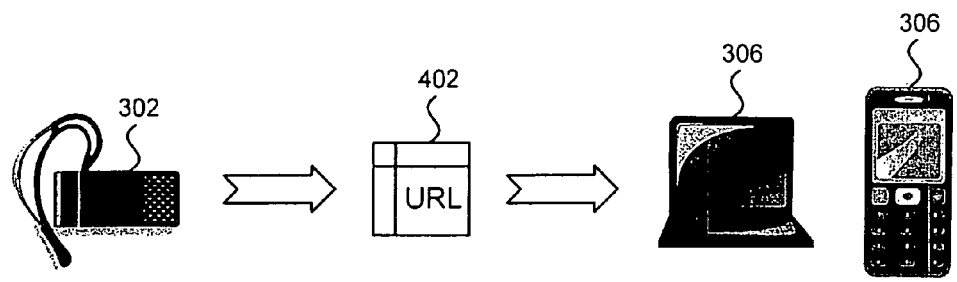
FIGS. 4A, 4B, and 4C are block diagrams illustrating a second set of use cases for a headset and audio gateway system, in accordance with some embodiments of the present invention.
Figure 4B:
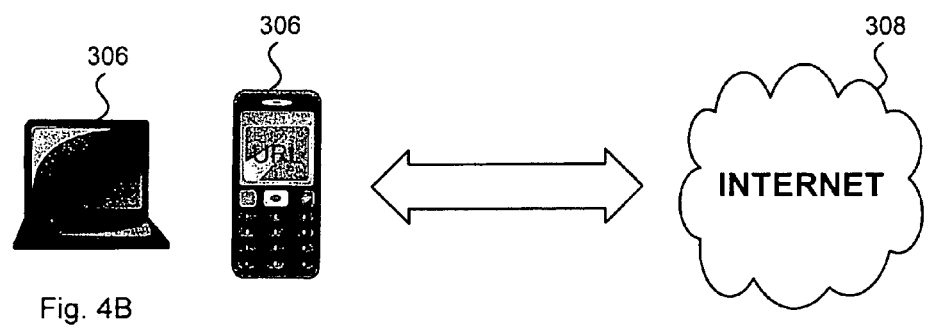
Figure 4C:
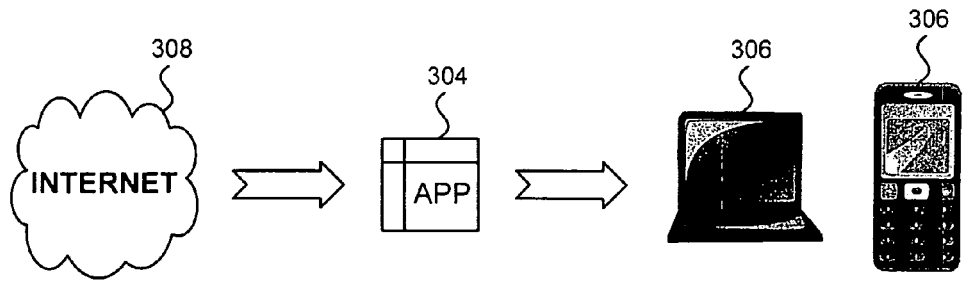

FIGS. 4A, 4B, and 4C are block diagrams illustrating a second set of use cases for a headset and audio gateway system, in accordance with some embodiments of the present invention. In these use cases, instead of, or in addition to an application, headset 302 transfers a uniform resource locator (e.g., URL, web address, or other form of data 402) to an audio gateway 306. This use case may arise because headset 302 does not have the ability to store an application or a particular type of application, but is able to transfer text data over a suitable connection. This use case may also arise because a service discovery process has determined that the audio gateway does not support transfer of an application from the headset to the gateway using the available transport mechanisms. Instead, in these cases the present invention can leverage use of the wireless application protocol (WAP). This protocol adds predefined symbols and tags to a string, and is essentially metadata that describes a URL. Audio gateway 306 can be configured to understand that it is receiving a URL and in response to open up an Internet connection and access that resource.

As shown in FIG. 4A, headset 302 sends a metadata file or URL 402 to audio gateway 306. The metadata file or URL allows the headset user to select a desired web-site or network location, which will activate a connection between audio gateway 306 and the Internet or other network 308, as depicted in FIG. 4B. In some embodiments, the URL or metadata may provide the web address for a desired application 304, and is a means for accessing and downloading application 304 onto audio gateway 306, as depicted in FIG. 4C. Note that application 304 may be any suitable application that a user of headset 302 desires to have access to and that may be installed and executed on audio gateway 306 or other device connected to the Internet or other network 308. Thus, in some embodiments or use cases, headset 302 transfers data or metadata representing a resource location or resource identifier to audio gateway 306, instead of an application. Audio gateway 306 recognizes the data as representing a resource location or resource identifier and in response accesses the Internet or another network to obtain the resource. The resource may be an application or configuration file which is then downloaded and installed on gateway 306.

In some embodiments, application 304 may be one that enables voice commands issued from headset 302 to control certain operations or functions of audio gateway 306, or of an application resident on the gateway or on a server connected to the gateway by a communications network. In some embodiments, application 304 may be one that enables a user to configure certain operations or functions of headset 302 by using the user interface(s) of audio gateway 306 or another device (in such cases the application may be termed a "dashboard"). Such operations or functions may include, but are not limited to, altering configuration parameters, storing data or applications on headset 302, downloading data or applications from headset 302, etc.

Figure 5A:
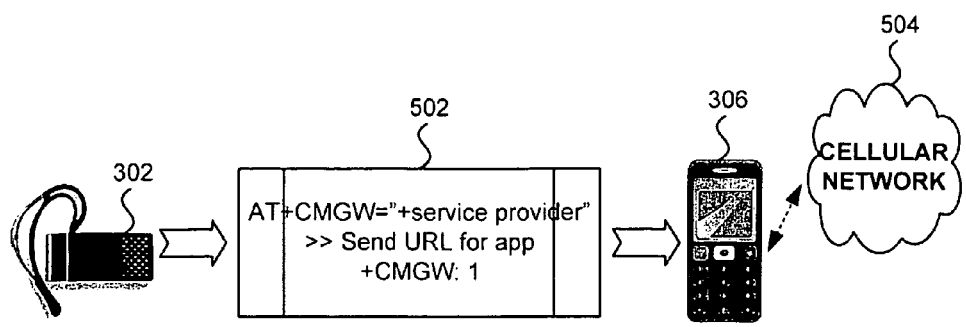
FIGS. 5A, 5B, and 5C are block diagrams illustrating a third set of use cases for a headset and audio gateway system, in accordance with some embodiments of the present invention.
Figure 5B:
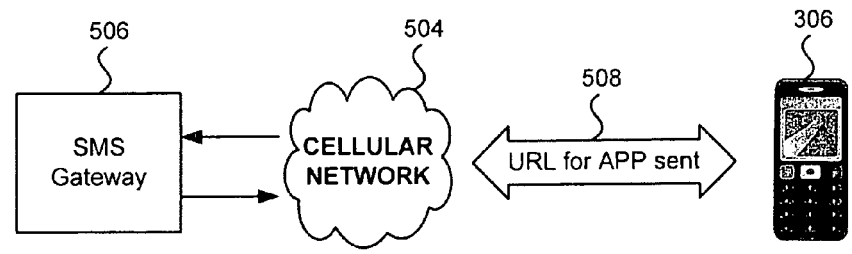
Figure 5C:
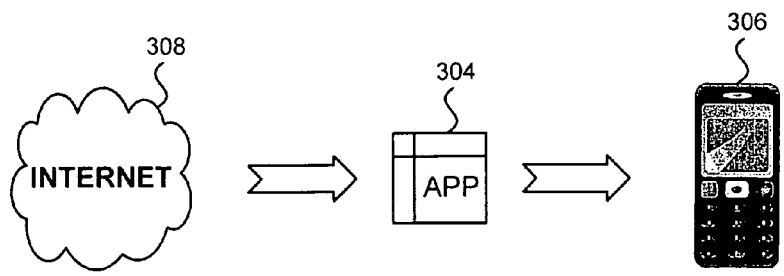

FIGS. 5A, 5B, and 5C are block diagrams illustrating a third set of use cases for a headset and audio gateway system, in accordance with some embodiments of the present invention. In these use cases, a short message service (SMS) messaging protocol may be used to access an application and control its transfer to an audio gateway 306, where the application resides on the Internet or another network that may be accessed by audio gateway 306 (e.g., a SMS gateway resident on a corporate network). It is noted that SMS can use a set of commands referred to as AT commands (attention commands) to send a text message. AT commands are used in telephony systems and networks to signal events such call waiting, busy signal, putting a call on hold, etc. AT commands are typically sent over a cell network by the phone to the network provider. If the headset sends an AT command to audio gateway 306 (e.g., a mobile phone), then the gateway acts on it by sending a request to the network provider. Referring to FIG. 5A, in this example, headset 302 sends a string or message 502 that audio gateway 306 (e.g., a mobile phone) receives and then parses and executes. As shown in the figure, headset 302 sends an AT command that contains an identification of a service provider. In the case of audio gateway 306 being a mobile communications device, device 306 then accesses the identified service provider using a cellular network 504 which may be coupled to the Internet or other network. In some embodiments, as shown in FIG. 5B, the service provider may include an SMS gateway 506 that has been configured to receive and process the AT commands or SMS messages. Note that gateway 506 may also be resident on a corporate network and provide access to corporate data or applications. Gateway 506 may also reside on a public network (e.g., the Internet) and be configured to respond to a specified AT command or SMS message by providing a response in accordance with a predefined set of rules or conditions.

The AT command is sent to audio gateway 306 and audio gateway 306 then sends the message via a cellular network 504. In some embodiments, the message may be a URL 508 for an application. In some embodiments, audio gateway 306 sends a text message to a predefined number and URL 508 for the application is a reply from gateway 506 to audio gateway 306. Using URL 508, application 304 may then be downloaded from the Internet or another network 308 to audio gateway 306 (as depicted in FIG. 5C). In some cases this may allow a user of audio gateway 306 to obtain application 304 that is also stored on headset 302 in situations in which audio gateway 306 is not able to receive the application over the available transport mechanism between the headset and gateway.

Figure 6:
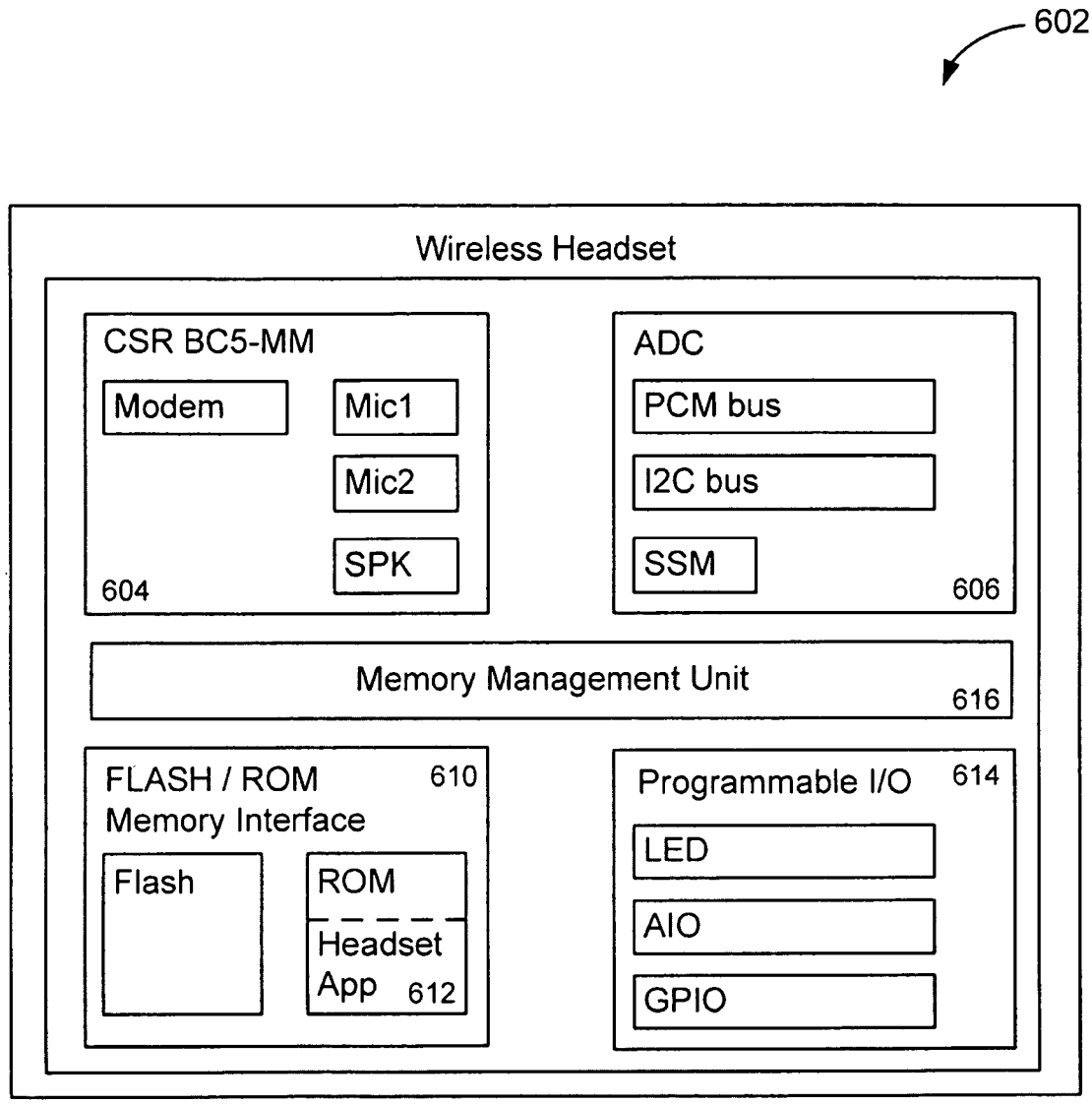
FIG. 6 is a block diagram of various hardware elements of a wireless headset that may be used as part of the inventive headset and gateway system, in accordance with some embodiments of the present invention.

FIG. 6 is a block diagram of various hardware elements of a wireless headset 602 that may be used as part of the inventive headset and gateway system, in accordance with some embodiments of the present invention. The elements include a multimedia chipset 504 including Bluetooth capability. The chipset 604 can be a CSR BC5-MM chipset (as commercially available), but embodiments of the invention are not limited to using such a chipset. In some embodiments, chipset 604 includes support for multiple microphones, a speaker, and a modem. In an embodiment of the headset, there is a dual microphone configuration and an additional skin movement or speech sensing microphone (also referred to as SSM, shown as part of analog-to-digital converter 606). As mentioned, an implementation of a speech sensor and associated components and signal processing that is suitable for use in a headset that may be used as part of the present invention is described in the aforementioned U.S. Pat. No. 7,246,058, issued Jul. 17, 2007, entitled "Detecting Voiced and Unvoiced Speech Using Both Acoustic and Nonacoustic Sensors." In some embodiments, chipset 604 executes a software stack which is described in greater detail with reference to FIG. 7. In some embodiments, analog-to-digital converter 606 includes the SSM, a PCM bus and an I2C bus.

Memory management unit (MMU) 616 communicates with a memory interface 610. Memory interface 610 may include flash memory, and ROM memory. In some embodiments, the ROM memory stores the headset resident applications 612 as previously described herein. Applications 612 may interact or communicate with one or more of profiles 712, which are described with reference to FIG. 7. The profiles, in turn, access applications 612 from the ROM of memory interface 610.

A programmable input/output (PIO) module 614 may include light emitting diodes (LEDs) on the headset that are controlled or programmed by the PIO pins. Analog IO access (AIO) and general purpose IO (GPIO) may also be provided.

Figure 7:
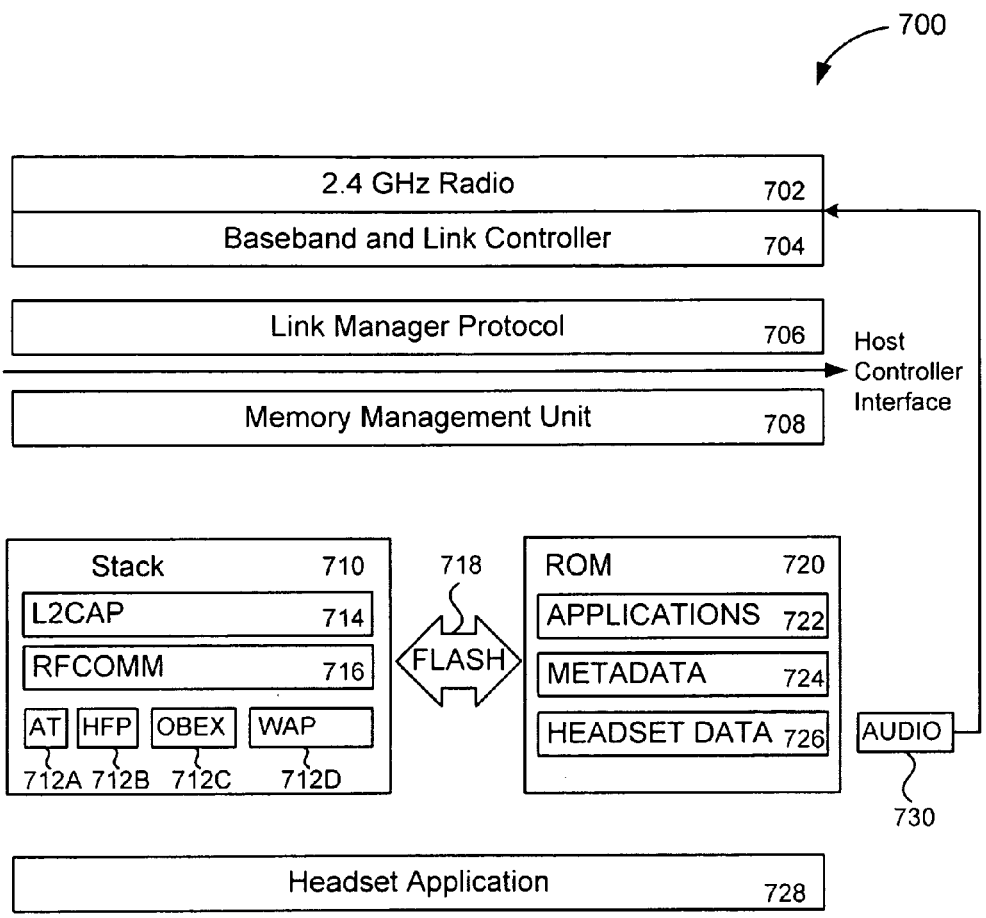
FIG. 7 is a block diagram of an architecture including software components for a headset that may be used as part of the inventive headset and gateway system, in accordance with some embodiments of the present invention.

FIG. 7 is a block diagram of an architecture 700 including software components for a headset that may be used as part of the inventive headset and gateway system, in accordance with some embodiments of the present invention. As shown in the figure, a radio 702, a Baseband and Link Controller 704, a Link Manager Protocol 706, and an MMU 708 are run by chipset 604 of FIG. 6. Radio 602, and Baseband and Link Controller 604 receive incoming audio signals 730.

A stack 710 that may be proprietary to the headset includes an L2CAP module 714, a radio frequency communication (RFCOMM) module 716, and profiles 712. The profiles may be used in the various use cases as illustrated in FIGS. 3-5. The profiles may include an AT profile 712A, an HFP profile 712B, an object OBEX profile 712C, and a wireless application protocol (WAP) profile 712D, but embodiments of the present invention are not limited to using such profiles. Note that any protocols that are usable with the radio could have associated profiles. As examples, the use case of FIG. 3 could use the OBEX profile 712C; the use case of FIG. 4 could use the WAP profile 712D; and use case FIG. 5 could use the AT profile 712A.

Flash interface 718 provides an interface with Flash ROM 720. Flash Rom 720 is where the data to be sent by the headset to a gateway is stored. The data may include application 722, metadata 724, or headset data 726. Headset application 728 may also be part of architecture 700.

Figure 8:
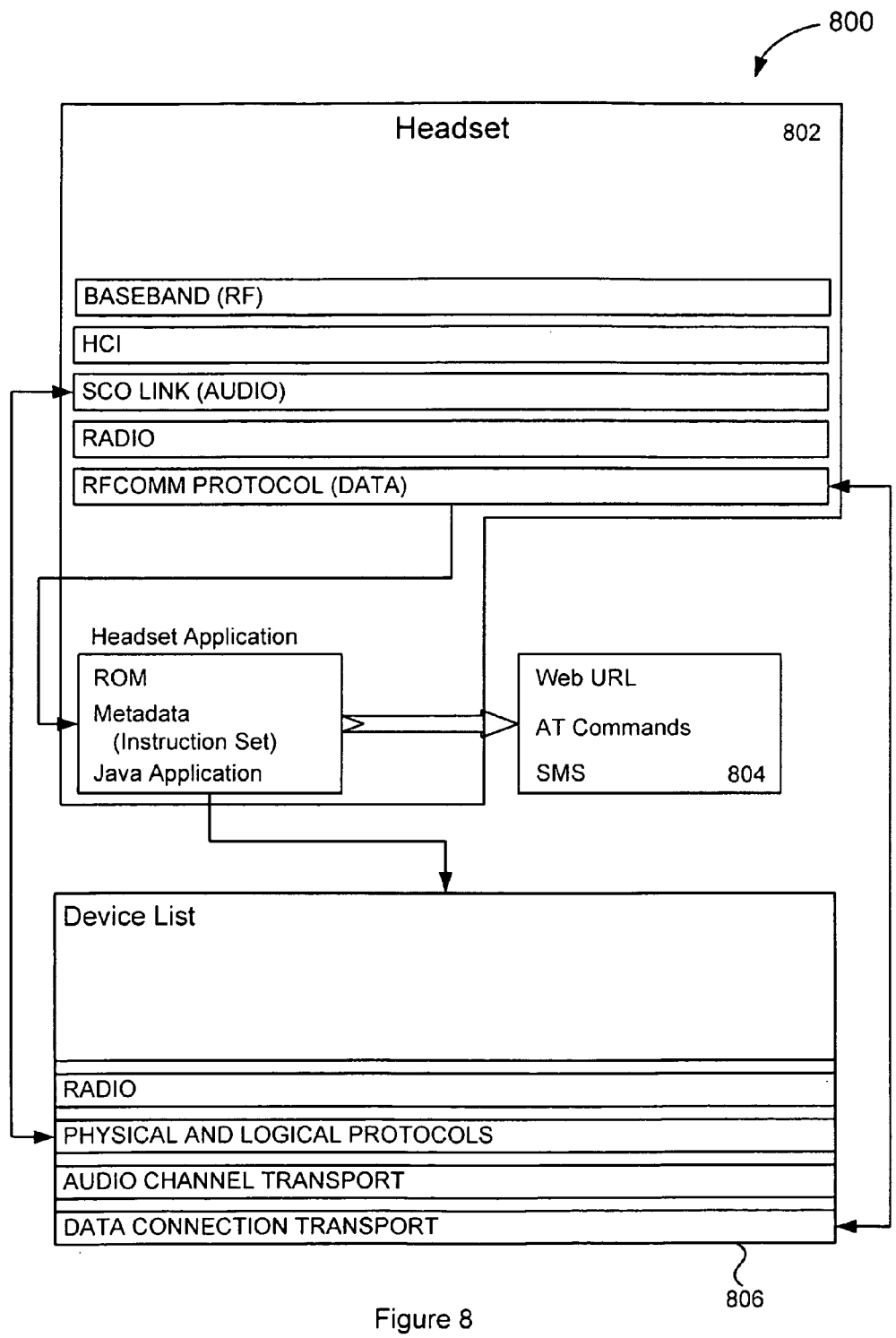
FIG. 8 is a block diagram of a headset application system, in accordance with some embodiments of the present invention.

FIG. 8 is a bock diagram of a headset application system 800, in accordance with some embodiments of the present invention. In some embodiments, system 800 includes a headset 802, data 804 and a device list 806. For a wireless headset, headset 802 includes various communications hardware and software to provide the wireless speaking and listening capabilities required, such as baseband RF, HCI, an SCO link, a radio and RFCOMM protocol data.

The headset application is shown stored in a memory device (in this case a ROM) and includes metadata, and a JAVA application. Depending upon the capabilities of the audio gateway, as previously described, the application may transfer data 804 including, but not limited to, a URL, AT commands, or SMS messages to the audio gateway.

Device list 806 is a non-exhaustive list of devices including mobile phones, PDAs, etc. that communicate wirelessly using radios, physical and logical protocols, audio channel transport, and data connection transport. The information contained in device list 806 (which in the example shown is stored on the audio gateway) may include a list of paired devices (based on Bluetooth or another protocol), although typically the gateway is only connected to a single device of a specific type at one time. There may be a similar or different list stored on the headset. This list could indicate that the headset is paired to more than one audio gateway (thus the headset may have a list of paired gateways and the gateway has a list of paired headsets). The lists can be downloaded to a PC, edited and replaced.

It is noted that each of the steps depicted in the diagrams and/or discussed herein can itself include one or more operations that are not described herein. Those skilled in the relevant art can create routines, algorithms, source code, microcode, program logic arrays or otherwise implement the invention based on the diagrams and the detailed description provided herein. The routines described herein can be provided using one or more of the following, or one or more combinations of the following: stored in non-volatile memory (not shown) that forms part of an associated processor or processors, implemented using conventional programmed logic arrays or circuit elements, stored in removable media such as disks, downloaded from a server and stored locally at a client, hardwired or preprogrammed in chips such as EEPROM semiconductor chips, application specific integrated circuits (ASICs), or provided by digital signal processing (DSP) integrated circuits.

The methods, operations or processes may be implemented by a processor executing a set of instructions, where those instructions are stored in a memory accessible by the processor. The processor may be part of the headset, audio gateway, or both. The data storage or memory (e.g., ROM or RAM) may be part of the headset, audio gateway or both. The instructions or instruction set may be stored in the internal headset or audio gateway memory initially, or provided on a storage medium. For example, the storage medium may be a computer-readable medium having instructions stored thereon, where when executed by a processor, the instructions implement one or more methods or processes of the present invention.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other headset systems, not only for the headset system or type of system described. Further, the elements and acts of the various embodiments described above can be combined to provide further embodiments.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware, software or a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A headset for use with an audio gateway, comprising:
   a data storage medium;
   an application stored in the data storage medium; and
   a file stored in the data storage medium, the file including data or metadata identifying a network location of the application,
   wherein the headset is operative to
      communicate with the audio gateway; and
      determine an available method for transferring or causing the transfer of the application to the audio gateway.

2. The headset of claim 1, wherein the application, when installed on the audio gateway, provides a voice input interface for the audio gateway, thereby enabling voice inputs provided by the headset to control a function or operation of the audio gateway.

3. The headset of claim 1, wherein the application, when installed on the audio gateway, provides a dashboard for configuration of a function of the headset.

4. The headset of claim 1, wherein the data or metadata includes a URL identifying the network location of the application.

5. The headset of claim 1, wherein the headset is operative to provide the data or metadata identifying the network location of the application in a command or message to the audio gateway.

6. The headset of claim 1, wherein the headset communicates with the audio gateway using a wireless technology.

7. The headset of claim 6, wherein the wireless communications technology is based on a Bluetooth protocol.

8. The headset of claim 1, wherein the audio gateway is one or more of a mobile telephone, personal computer, personal digital assistant, gaming console or telephony device connected to a network.

9. A method of providing a service to a user of a headset, comprising:
   establishing a communication channel between the headset and an audio gateway;
   determining the data transfer capabilities of the audio gateway;
   operating the headset to transfer an application to the audio gateway, wherein the method of transferring the application is determined in response to determining the data transfer capabilities of the audio gateway; and
   installing the application on the audio gateway, wherein execution of the application provides the service to the user.

10. The method of claim 9, wherein transferring the application to the audio gateway further comprises downloading the application from the headset to the audio gateway over the communications channel.

11. The method of claim 9, wherein transferring the application to the audio gateway further comprises:
    transferring data identifying a network location of the application from the headset to the audio gateway over the communications channel; and
    the audio gateway obtaining the application from the network location.

12. The method of claim 11, wherein the data identifying the network location of the application is contained in an SMS message.

13. The method of claim 11, wherein the data identifying the network location of the application is a URL.

14. The method of claim 11, wherein the data identifying the network location of the application is part of an AT command.

15. The method of claim 11, wherein the network location is a server coupled to the Internet.

16. The method of claim 9, wherein the application is a dashboard to enable configuration of a function of the headset using the audio gateway.

17. The method of claim 9, wherein the application enables voice inputs from the headset to be used to control a function or operation of the audio gateway.

18. The method of claim 9, wherein the application enables voice inputs from the headset to be used to control a function or operation of a second application.

19. The method of claim 18, wherein the second application is installed on the audio gateway.

20. The method of claim 8, wherein the second application is installed on a server that is communicatively coupled to the audio gateway.

21. The method of claim 9, wherein the headset is a wireless headset that communicates with the audio gateway using a wireless communications technology.

22. The method of claim 21, wherein the wireless communications technology is based on a Bluetooth protocol.

23. The method of claim 9, further comprising determining the data storage or computational processing capabilities of the audio gateway, and further, wherein the method of transferring the application is determined in response to determining the data storage or computational processing capabilities of the audio gateway.

24. A method of operating an audio gateway, comprising:
receiving a file from a headset over a communications channel;
based on the file, determining a location of an application resident on a network;
obtaining the application from the location on the network; and
installing the application on the audio gateway.

25. The method of claim 24, wherein the application enables voice inputs from the headset to be used to control a function or operation of the audio gateway, and the method further comprises:
receiving a voice command from the headset; and
in response to receiving the voice command, executing a function or operation of the audio gateway.

26. The method of claim 24, wherein the audio gateway is one or more of a mobile telephone, personal computer, personal digital assistant, gaming console or telephony device connected to a network.

27. The method of claim 24, wherein the application is a dashboard to enable configuration of a function of the headset using the audio gateway.

28. The method of claim 24, wherein the application enables voice inputs from the headset to be used to control a function or operation of a second application.

29. The method of claim 28, wherein the second application is installed on the audio gateway.

30. The method of claim 28, wherein the second application is installed on a server that is communicatively coupled to the audio gateway.

31. The method of claim 24, further comprising transferring a data file to the headset, the data file containing user profile or configuration data for a user.

32. A headset and audio gateway system, comprising:
the headset, wherein the headset further comprises
a data storage medium;
an application stored in the data storage medium; and
a file stored in the data storage medium, the file including data or metadata identifying a network location of the application,
and further, wherein the headset is operative to
communicate with an audio gateway; and
determine available methods for transferring or causing the transfer of the application to the audio gateway; and
the audio gateway, wherein the audio gateway is operative to
receive the file from the headset over a communications channel;
based on the file, determine the location of the application;
obtain the application from the location on the network; and
install the application on the audio gateway.

33. The system of claim 32, wherein the application enables voice inputs from the headset to be used to control a function or operation of the audio gateway, and the audio gateway is operative to:
receive a voice command from the headset; and
in response to receiving the voice command, execute a function or operation of the audio gateway.

34. The system of claim 32, wherein the audio gateway is one or more of a mobile telephone, personal computer, personal digital assistant, gaming console or telephony device connected to a network.

35. The system of claim 32, wherein the application is a dashboard to enable configuration of a function of the headset using the audio gateway.

36. The system of claim 32, wherein the application is one that enables voice inputs from the headset to be used to control a function or operation of a second application.

37. The system of claim 36, wherein the second application is installed on the audio gateway.

38. The system of claim 36, wherein the second application is installed on a server that is communicatively coupled to the audio gateway.

39. The system of claim 32, wherein the headset is operative to transfer an API to the audio gateway, the API enabling the gateway to access functions, operations, or data of the headset.

40. The system of claim 32, wherein the application enables a user to access content over a network or conduct a search operation over the network.

41. The system of claim 32, wherein the application enables a user to access data and convert the data to speech for communication to the headset.

42. The system of claim 32, wherein the application enables a user to discover a capability of the audio gateway.

* * * * *